(12) United States Patent
Zhang et al.

(10) Patent No.: US 9,258,095 B2
(45) Date of Patent: *Feb. 9, 2016

(54) UPLINK DEMODULATION REFERENCE SIGNAL DESIGN FOR MIMO TRANSMISSION

(71) Applicant: Samsung Electronics Co., Ltd., Suwon-si, Gyeonggi-do (KR)

(72) Inventors: Jianzhong Zhang, Plano, TX (US); Young-Han Nam, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/552,133

(22) Filed: Nov. 24, 2014

(65) Prior Publication Data

US 2015/0139130 A1 May 21, 2015

Related U.S. Application Data

(63) Continuation of application No. 12/970,568, filed on Dec. 16, 2010, now Pat. No. 8,908,617.

(60) Provisional application No. 61/360,363, filed on Jun. 30, 2010, provisional application No. 61/291,717, filed on Dec. 31, 2009.

(51) Int. Cl.
*H04W 72/04* (2009.01)
*H04L 5/00* (2006.01)
(Continued)

(52) U.S. Cl.
CPC ............ *H04L 5/0051* (2013.01); *H04B 7/0452* (2013.01); *H04B 7/0486* (2013.01); *H04B 7/0626* (2013.01); *H04L 5/003* (2013.01); *H04L 5/0091* (2013.01); *H04W 72/042* (2013.01); *H04W 48/08* (2013.01); *H04W 88/08* (2013.01)

(58) Field of Classification Search
None
See application file for complete search history.

(56) References Cited

U.S. PATENT DOCUMENTS

2009/0109906 A1 4/2009 Love et al.
2009/0279493 A1 11/2009 Gaal et al.
(Continued)

FOREIGN PATENT DOCUMENTS

EP 2056515 A1 5/2009
WO WO 2009/056464 A1 5/2009

OTHER PUBLICATIONS

International Search Report dated Aug. 31, 2011 in connection with International Patent Application No. PCT/KR2010/009390.
(Continued)

*Primary Examiner* — Chirag Shah
*Assistant Examiner* — Srinivasa Reddivalam (57) ABSTRACT

A base station capable of communicating with a plurality of subscriber stations is provided. The base station transmits control information and data to at least one of the plurality of subscriber stations in a subframe using a subset of antenna ports corresponding to a subset of antenna port numbers. The base station maps reference signals corresponding to the subset of antenna ports according to a transmission rank R. The base station indicates, via a cyclic shift indicator (CSI) field in an uplink grant, an assigned resource index corresponding to the mapped reference signal. The CSI field includes a cyclic shift and an orthogonal cover code (OCC) index. The subscriber station uses a resource mapping table to identify the assigned resource index based on the transmission rank, cyclic shift and OCC index.

20 Claims, 4 Drawing Sheets

(51) Int. Cl.
*H04B 7/04* (2006.01)
*H04B 7/06* (2006.01)
*H04W 48/08* (2009.01)
*H04W 88/08* (2009.01)

(56) References Cited

U.S. PATENT DOCUMENTS

| | | | |
|---|---|---|---|
| 2010/0296465 A1* | 11/2010 | Hooli et al. | 370/329 |
| 2011/0111781 A1 | 5/2011 | Chen et al. | |
| 2011/0142107 A1* | 6/2011 | Pan et al. | 375/219 |
| 2011/0249767 A1 | 10/2011 | Chen et al. | |

OTHER PUBLICATIONS

Written Opinion of the International Searching Authority dated Aug. 31, 2011 in connection with International Patent Application No. PCT/KR2010/009390.

Translated Japanese Office Action dated Jul. 30, 2013 in connection with Japanese Patent Application No. 2012-547006; 7 pages.

3GPP TSG RAN WG1 Meeting #59; "Performance of uplink MU-MIMO with enhanced demodultion reference signal structure"; Nokia Siemens Networks, Nokia; Nov. 9-13, 2009; Jeju, South Korea; 4 pages.

Chinese Office Action dated May 19, 2014 in connection with Chinese Patent Application No. 2014051401151970; 9 pages.

3GPP TSG RAN WG1 Meeting #59; "Investigation for DMRS of rank 5-8"; ZTE; Nov. 9-13, 2009; Jeju, South Korea; 12 pages.

Translated Korean Notice of Patent Grant dated Jul. 1, 2014 in connection with Korean Patent Application No. 10-2012-7016215; 6 pages.

Translated Chinese Office Action dated May 19, 2014 in connection with Chinese Patent Application No. 2010800602330; 8 pages.

Translated Korean Notice of Patent Grant dated Sep. 22, 2014 in connection with Korean Patent Application No. 10-2014-7016897; 7 pages.

* cited by examiner

UPLINK DEMODULATION REFERENCE SIGNAL DESIGN FOR MIMO TRANSMISSION

CROSS-REFERENCE TO RELATED APPLICATION(S) AND CLAIM OF PRIORITY

This application is a continuation of U.S. patent application Ser. No. 12/970,568, filed Dec. 16, 2010 which claims priority to U.S. Provisional Patent No. 61/291,717, filed Dec. 31, 2009 and U.S. Provisional Patent No. 61/360,363, filed Jun. 30, 2010, and is incorporated herein by reference into this disclosure as if fully set forth herein.

TECHNICAL FIELD OF THE INVENTION

The present application relates generally to wireless communications and, more specifically, to a system and method for transmitting downlink reference signals in a multi-user multiple input multiple output system.

BACKGROUND OF THE INVENTION

Modern communications demand higher data rates and performance. Multiple-input multiple-output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

Additionally, a downlink physical signal corresponds to a set of resource elements used by the physical layer but does not carry information originating from higher layers. The following downlink physical signals are defined: Synchronization signal and Reference signal.

The reference signal consists of known symbols transmitted at a well defined OFDM symbol position in the slot. This assists the receiver at the user terminal in estimating the channel impulse response to compensate for channel distortion in the received signal. There is one reference signal transmitted per downlink antenna port and an exclusive symbol position is assigned for an antenna port (when one antenna port transmits a reference signal other ports are silent). Reference signals (RS) are used to determine the impulse response of the underlying physical channels.

SUMMARY OF THE INVENTION

A base station capable of communicating with a plurality of subscriber stations is provided. The base station includes a transmit path. The transmit path includes circuitry configured to: transmit control information and data to at least one of the plurality of subscriber stations in a subframe; transmit a plurality of resource blocks in the subframe; transmit the data using a subset of antenna ports corresponding to a subset of antenna port numbers; map reference signals corresponding to the subset of antenna ports according to a transmission rank R; and indicate, via a cyclic shift indicator (CSI) field in an uplink grant, an assigned resource index corresponding to the mapped reference signal. The CSI field includes a cyclic shift and an orthogonal cover code (OCC) index.

A subscriber station capable of communicating with at least one base station is provided. The subscriber station includes a receiver configured to receive control information and data from at least one of the plurality of base stations in a subframe. The receiver is configured to receive a plurality of resource blocks in the subframe. The subscriber station also includes a controller configured to identify, in a cyclic shift indicator (CSI) field in an uplink grant, an assigned resource index corresponding to a reference signal mapped corresponding to a subset of antenna ports according to a transmission rank R. The CSI field includes a cyclic shift and an orthogonal cover code (OCC) index. The controller is also configured to cause the receiver to receive the data using a subset of antenna ports corresponding to the subset of antenna port numbers and identify the mapped reference signals.

A method operating a base station capable of communicating with a plurality of subscriber stations is provided. The method includes transmitting control information and data to at least one of the plurality of subscriber stations in a subframe; transmitting a plurality of resource blocks in the subframe; and transmitting the data using a subset of antenna ports corresponding to the subset of antenna port numbers. The method also includes mapping reference signals corresponding to the subset of antenna ports according to a transmission rank R; and indicating, via a cyclic shift indicator (CSI) field in an uplink grant, an assigned resource index corresponding to the mapped reference signal. The CS field comprising a cyclic shift and an orthogonal cover code (OCC) index.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Figure 1:
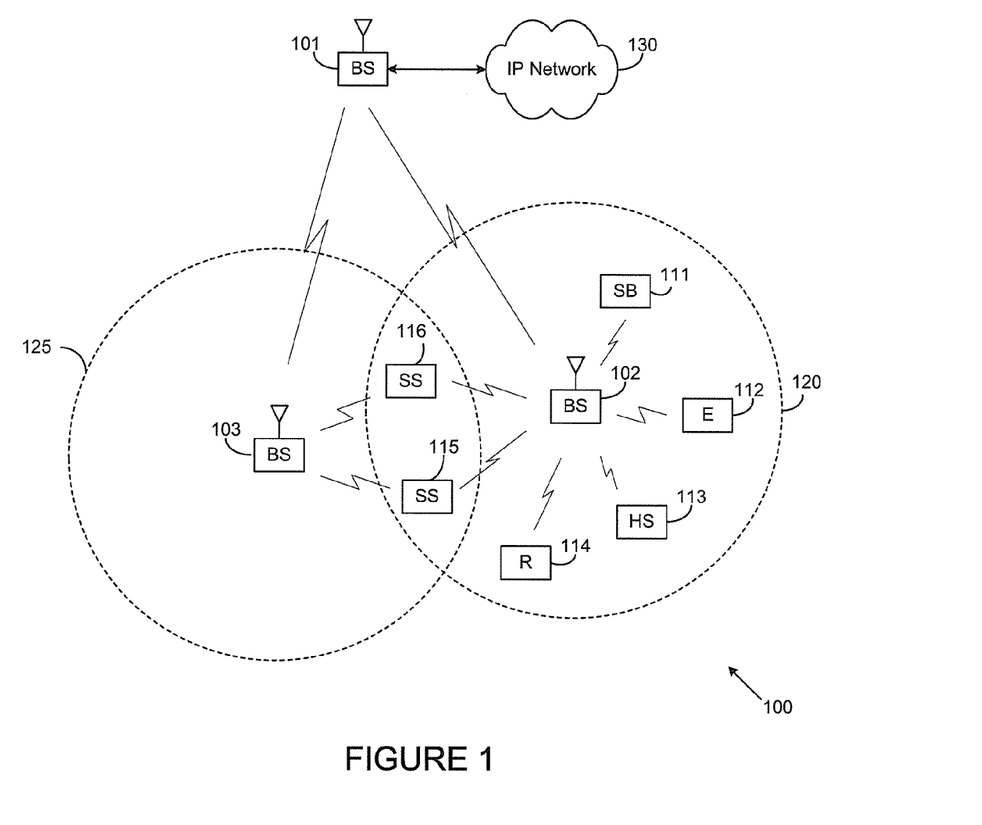
FIG. 1 illustrates an exemplary wireless network, which transmits ACK/NACK messages according to an exemplary embodiment of the disclosure.

FIG. 1 illustrates an exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a wireless fidelity (WiFi) hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
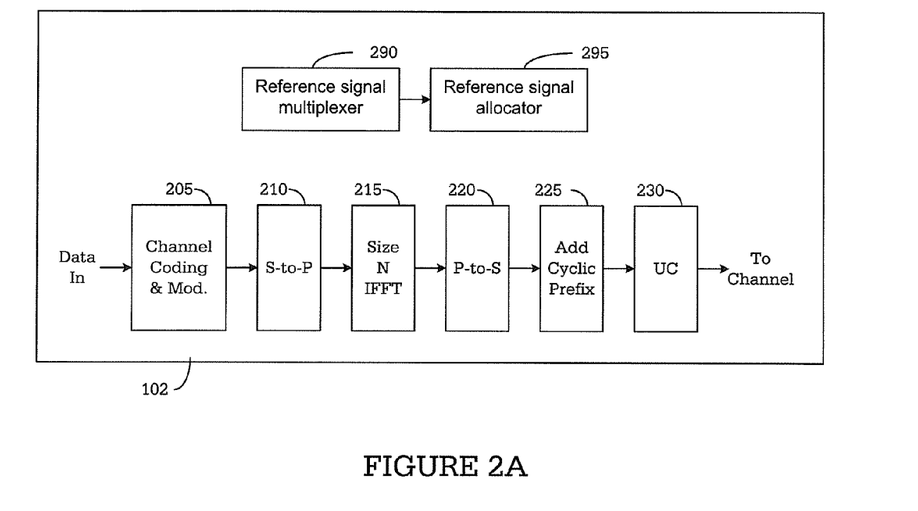
FIG. 2A illustrates a high-level diagram of an orthogonal frequency division multiple access transmit path according to an exemplary embodiment of the disclosure.
Figure 2B:
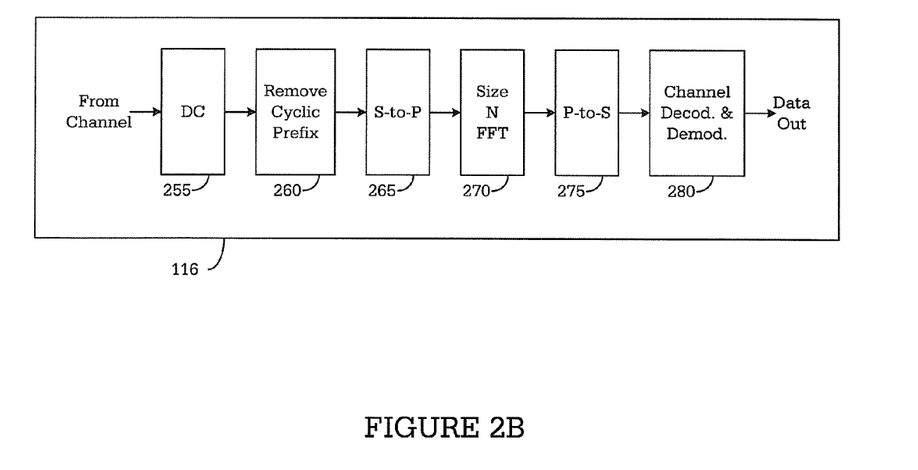
FIG. 2B illustrates a high-level diagram of an orthogonal frequency division multiple access receive path according to an exemplary embodiment of the disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230, a reference signal multiplexer 290, and a reference signal allocator 295. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., LDPC coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The base station 102 can enable (e.g., activate) all of its antenna ports or a subset of antenna ports. For example, when BS 102 includes eight antenna ports, BS 102 can enable four of the antenna ports for use in transmitting information to the subscriber stations. It will be understood that illustration of BS 102 enabling four antenna ports is for example purposes only and that any number of antenna ports could be activated.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 3:
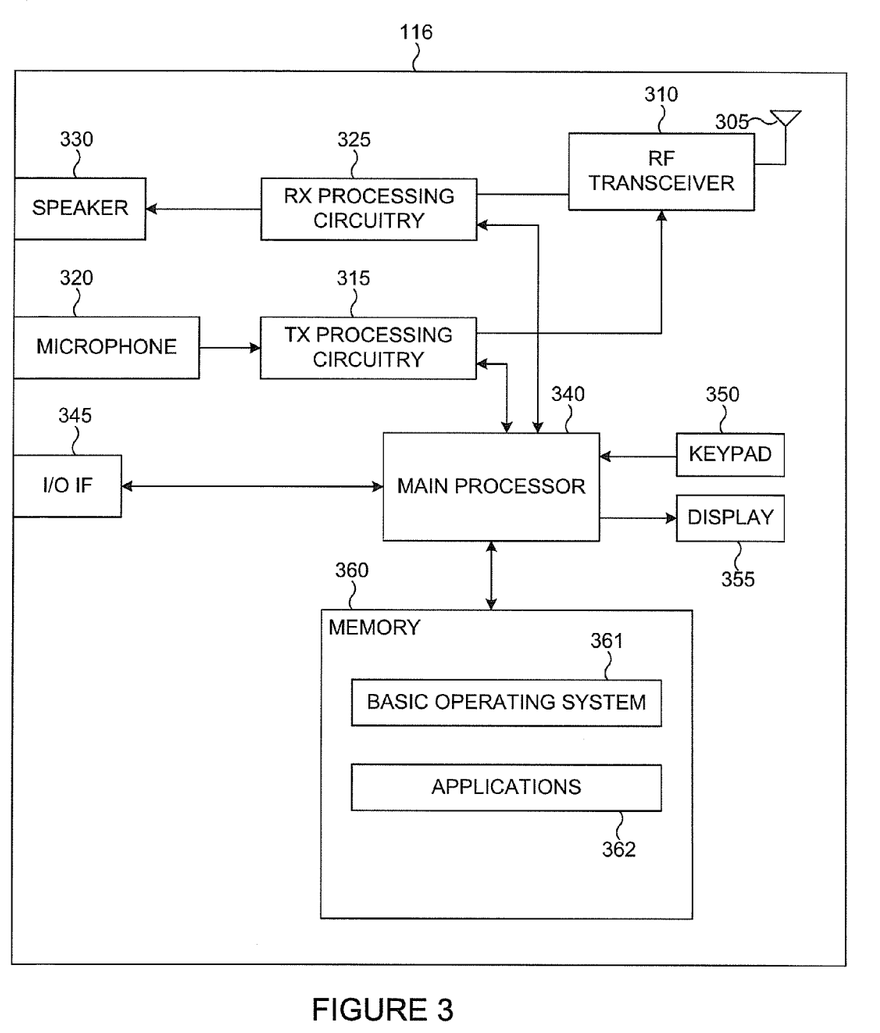
FIG. 3 illustrates an exemplary wireless subscriber station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for CoMP communications and MU-MIMO communications. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

The Multi-user MIMO (MU-MIMO) operation is specified for LTE Release-8 system: 3GPP TS 36.211 v 8.8.0, "*E-UTRA, Physical channels and modulation*"; 3GPP TS 36.212 v 8.8.0, "*E-UTRA, Multiplexing and Channel coding*"; and 3GPP TS 36.213 v8.8.0, "*E-UTRA, Physical Layer Procedures*", the contents of each are incorporated by reference. For example, the demodulation reference signal for the Physical Uplink Shared Channel (PUSCH) is defined in section 5.5.2.1 of *E-UTRA, Physical channels and modulation*. In addition, an Uplink (UL) grant is carried using DCI format as defined in Section 5.3.3.1.1 of *E-UTRA, Multiplexing and Channel coding* and sections 5.1.1.1, 7.2.1, 7.3 and 8 of *E-UTRA, Physical Layer Procedures*.

Figure 4:
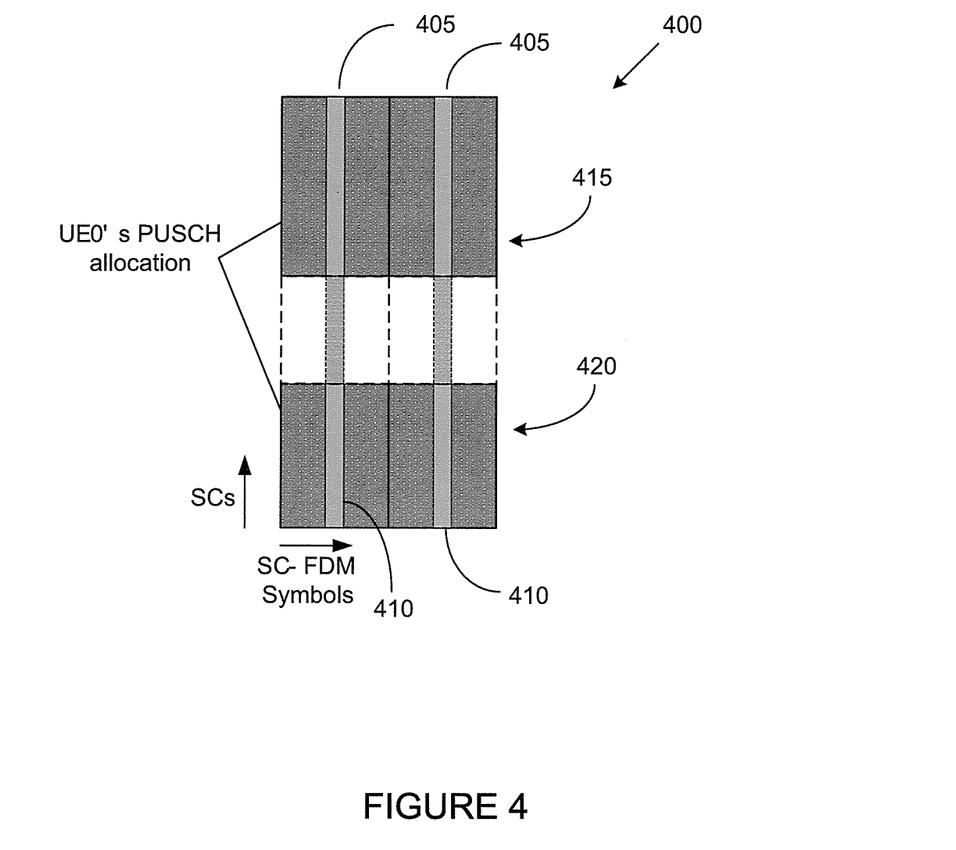
FIG. 4 illustrates separate downlink reference modulation signal (DMRS) sequences with different lengths according to embodiments of the present disclosure.

FIG. 4 illustrates separate downlink reference modulation signal (DMRS) sequences with different lengths according to embodiments of the present disclosure. The embodiment of the DRMS sequences shown in FIG. 4 is for illustration only. Other embodiments could be used without departing from the scope of this disclosure.

In some embodiments, the base station uses a DCI format 0A for UL grant that allows MIMO transmission in the uplink. The difference of 0A, as compared to format 0 can include the following. For second codeword, an additional NDI bit field is included and an additional MCS and redundancy field is included. The resource allocation header is configured to indicate type0/type 1 allocation. The resource allocation field is expanded to allow both type 0 and type 1 allocation. The Precoding Matrix Index (PMI)/Rank Indicator (RI) field indicates the rank and codeword used in this transmission. The hopping field is only useful for transmissions with low rank up to p, p=1 or 2. BS 102 can configure the value of p to SS 116 by higher-layer signaling. For example, if p=1, it means SS 116 will only perform hopping when a hopping flag is activated and when the rank of the transmission is "1." For other ranks, the hopping flags can be reserved for indicating other states of the transmission. The 3-bit cyclic shift (CS) field remains the same as format 0.

In some embodiments, separately generated DMRS sequences are used for the different resource segments in the uplink resource allocation. Each DMRS sequence 405, 410 includes the same length as each allocated segment 415, 420, and these DMRS sequence are ZC sequences that have the same group value u, sequence value v. The ZC sequences are UL RS sequences defined in LTE specification *E-UTRA, Physical channels and modulation*. SS 116 also will apply the same cyclic shift value $n_{DMRS}^{(2)}$ obtained from the 3-bit CS field in the uplink DCI format 0 or 0A, across all the segments, that is, all the segments share the same cyclic shift value. FIG. 4 illustrates a two-segment resource allocation 400. In the example shown in FIG. 4, L1, L2 are the lengths of the two segments 405, 410. SS 116 reads cyclic shift index CS0 from its UL grant and applies CS0 in both segments 415, 420.

In some embodiments, SS 116 autonomously applies a phase shift on the second segment 420 of the resource in order to reduce the overall peak-to-average power ratio (PAPR) of the transmission.

In some embodiments, separately generated DRMS sequences are used for the different resource segments in the uplink resource allocation. Each DMRS sequence includes the same length as the allocated segment, and these DMRS sequence are ZC sequences that have the same group value u, sequence value v. In addition, the segments use different cyclic shifts and the values of cyclic shifts are derived from the single 3-bit CS field in the UL grant 0 or 0A according to the following rule (assume CS0 is signaled in the CS field of DCI format): The first segment 415 is using CS0, where the first segment 415 is defined as the segment with lowest physical resource block (PRB) indices; the second segment 420, with the second lowest PRB indices, is using $CS0_{+a}$; the third segment is using CS0+2a; and so forth.

The value of a can be either fixed or BS 103 can signal the value to SS 116 via high-layer signaling in a UE-specific or cell-specific manner. The value "a" can be chosen to maximize the separation of cyclic shift in different segments. For example, assuming a two-segment allocation and CS0=0 and a 0.6, then the first segment 415 will use a cyclic shift value of 0, and the second segment 420 will use a cyclic shift value of CS0+a=6.

In some embodiments, the 3-bit CS field is used to jointly indicate the cyclic shift value and the orthogonal cover code (OCC) index. The detailed design is shown in the Table 1 to Table 4 for different transmission ranks, and the design is targeting the maximum separation in both CS value and OCC value, in both single user (SU) MIMO and multi user (MU) MIMO transmissions.

When the transmission rank is R (or R layers are scheduled to be transmitted from SS 116, or a precoding matrix signaled to SS 116 in a UL grant DCI has R columns, where R is an integer), R pairs of UL RS sequences in two SC-FDM symbols in two slots in a subframe are generated by R pairs of a CS value and an OCC value. These R pairs of a CS value and an OCC value are determined by the 3-bit field value signaled in a UL grant DCI. When R=1, 2, 3, 4, the 3-bit field value gives the first pair of a CS value and an OCC value for $1^{st}$ layer as shown in the second and the third row of Table 1, Table 2, Table 3 and Table 4, respectively. The second and later pairs for the $2^{nd}$ and later layers corresponding to the 3-bit field value are indicated in the fourth row of Table 2, Table 3 and Table 4, when R=2, 3, 4.

Table 2, Table 3 and Table 4 for R=2, 3, 4 are constructed by appending an additional row to the last row of Table 1. The $2^{nd}$, $3^{rd}$ and $4^{th}$ pairs of a CS value and an OCC value for R=2, 3, 4 are chosen such that.

1) when transmission rank is R, CS values are chosen to have maximum separation within 0, 1, ..., $CS_{max}$, (in 3GPP LTE, $CS_{max}$=12). That is, when the transmission rank is R and the 3-bit field indicates a first CS $n_{CS,1}$, the other CSs are shown in Equation 1:

$$n_{CS,r} = (n_{CS,1} + CS_{max}/R) \bmod CS_{max}, r=2,3,\ldots,R. \quad [\text{EQN. 1}]$$

Furthermore, an OCC paired with a CS $n_{CS,r}$ is found in a same column as $n_{CS,r}$ is listed in Table 1.

For an MU-MIMO example, if BS 103 schedules two UEs, such as SS 115 and SS 116, each with rank-1 transmission and the CS filed of SS 115 and SS 116 are "0" and "1", respectively, then these SS 115 will use the pair of (CS, OCC)=(0, W0) and SS 116 will use the pair (6, W1), and the maximum separation of 6 is achieved in CS dimension and maximum separation is also achieved in OCC domain since OCC has switched from W0 to W1.

In another SU-MIMO example, if BS 103 is scheduling SS 116 with rank-2 transmission, BS 103 can set the CS filed to "0", then SS 116 will read the first layer DMRS as pair (CS,OCC)=(0,W0), and the second layer will (implicitly) use the resource associated with the CS field "1", and there the pair (CS,OCC)=(6, W1). Again, maximum separation is achieved in this SU-MIMO case.

Table 1 illustrates Mapping from 3-bit CS field to CS and OCC: rank-1.

TABLE 1

| 3-bit field | 0 | 1 | 2 | 3 | 4 | 5 | 6 | 7 |
|---|---|---|---|---|---|---|---|---|
| CS | 0 | 6 | 3 | 4 | 2 | 8 | 10 | 9 |
| OCC | W0 | W1 | W0 | W1 | W0 | W1 | W0 | W1 |

Table 2 illustrates mapping from 3-bit CS field to CS and OCC: rank-2. Here $2^{nd}$ Resource index refers to the resource pair used by the $2^{nd}$ layer. A value of "1" for the $2^{nd}$ resource means the (CS, OCC) value is the same as the case when the 3-bit index is 1, that is (CS, OCC)=(6, W1).

TABLE 2

| 3-bit field (Resource index) | 0 | 1 | 2 | 3 | 4 | 5 | 6 | 7 |
|---|---|---|---|---|---|---|---|---|
| CS (for $1^{st}$ layer) | 0 | 6 | 3 | 4 | 2 | 8 | 10 | 9 |
| OCC (for $1^{st}$ layer) | W0 | W1 | W0 | W1 | W0 | W1 | W0 | W1 |

TABLE 2-continued

| 3-bit field (Resource index) | 0 | 1 | 2 | 3 | 4 | 5 | 6 | 7 |
|---|---|---|---|---|---|---|---|---|
| $2^{nd}$ Resource index (for $2^{nd}$ layer) | 1 | 0 | 7 | 6 | 4 | 4 | 3 | 2 |

Table 3 illustrates mapping from 3-bit CS field to CS and OCC: rank-3. Here $2^{nd}$ Resource index refers to the resource pair used by the $2^{nd}$ layer. A value of "3" for the $2^{nd}$ resource means the (CS, OCC) value is the same as the case when the 3-bit index is 3, that is, (CS, OCC)=(4, W1).

TABLE 3

| 3-bit field (Resource index) | 0 | 1 | 2 | 3 | 4 | 5 | 6 | 7 |
|---|---|---|---|---|---|---|---|---|
| CS (for $1^{st}$ layer) | 0 | 6 | 3 | 4 | 2 | 8 | 10 | 9 |
| OCC (for $1^{st}$ layer) | W0 | W1 | W0 | W1 | W0 | W1 | W0 | W1 |
| $2^{nd}$ and $3^{rd}$ Resource index (for $2^{nd}$ and $3^{rd}$ layers) | 3, 5 | 4, 6 | 7 | 0, 5 | 1, 6 | 0, 3 | 1, 4 | 2, 1 |

Table 4 illustrates mapping from 3-bit CS field to CS and OCC: rank-4. Here $2^{nd}$ Resource index refers to the resource pair used by the $2^{nd}$ layer. A value of "1" for the $2^{nd}$ resource means the (CS, OCC) value is the same as the case when the 3-bit index is 1, that is (CS, OCC)=(6, W1).

TABLE 4

| 3-bit field (Resource index) | 0 | 1 | 2 | 3 | 4 | 5 | 6 | 7 |
|---|---|---|---|---|---|---|---|---|
| CS (for $1^{st}$ layer) | 0 | 6 | 3 | 4 | 2 | 8 | 10 | 9 |
| OCC (for $1^{st}$ layer) | W0 | W1 | W0 | W1 | W0 | W1 | W0 | W1 |
| $2^{nd}$, $3^{rd}$ and $4^{th}$ Resource index (for $2^{nd}$, $3^{rd}$ and $4^{th}$ layers) | 1, 2, 7 | 0, 2, 7 | 0, 1, 7 | 4, 5, 6 | 3, 5, 6 | 3, 4, 6 | 3, 4, 5 | 0, 1, 2 |

That is, a first resource mapping table corresponding to a lower transmission rank is a subset of a second resource mapping table corresponding to a higher transmission rank. For example, resource mapping Table 1 for rank-1 is a subset (e.g., nested within) resource mapping Table 2 for rank-2. Further, resource mapping Table 2 for rank-2 is a subset (e.g., nested within) resource mapping Table 3 for rank-3; and resource mapping Table 3 for rank-3 is a subset (e.g., nested within) resource mapping Table 4 for rank-4.

In some embodiments, one resource mapping table is used for all ranks of uplink transmission. This allows BS 102 and SS 116 to implement only one table for all ranks of uplink transmission. The single resource mapping table, such as Tables 5-10, is configured such that the lower order individual rank tables are nested in the single resource mapping table.

The difference between this approach and the previous approach occurs in the rank-3 case. In the rank-3 case, the maximum separation among all three layers no longer holds. The third CS value corresponding to layer 3 for a given 3-bit field value when transmission rank is 3, is a CS value from those CS values giving maximum separation in CS in a 4 layer case, and is different from the first and the second CS values corresponding to layers 1 and 2. Table 4 is re-drawn into Table 5 for ease of exposition. Also, the ordering of the DMRS resources used for layers 2, 3, 4 are slightly different from the previous table. Table 6 shows another example, which is slightly different from Table 5 in that the 3-bit field indicates CS values only, implying that a UE would generate DM RS sequences without applying OCCs in two slots.

Table 5 illustrates mapping from 3-bit field to CS and OCC: ranks 1-4.

TABLE 5

| 3-bit field (Resource index) | 0 | 1 | 2 | 3 | 4 | 5 | 6 | 7 |
|---|---|---|---|---|---|---|---|---|
| (CS, OCC) Layer 1 | 0, W0 | 6, W1 | 3, W0 | 4, W1 | 1, W0 | 7, W1 | 10, W0 | 9, W1 |
| (CS, OCC) Layer 2 | 6, W1 | 0, W0 | 9, W1 | 10, W0 | 7, W1 | 1, W0 | 4, W1 | 3, W0 |
| (CS, OCC) Layer 3 | 3, W0 | 9, W1 | 6, W1 | 7, W1 | 10, W0 | 4, W1 | 1, W0 | 0, W0 |
| (CS, OCC) Layer 4 | 9, W1 | 3, W0 | 0, W0 | 1, W0 | 4, W1 | 10, W0 | 7, W1 | 6, W1 |

Table 6 illustrates mapping from 3-bit CS filed to CSs: ranks 1-4.

TABLE 6

| 3-bit field (Resource index) | 0 | 1 | 2 | 3 | 4 | 5 | 6 | 7 |
|---|---|---|---|---|---|---|---|---|
| (CS) Layer 1 | 0 | 6 | 3 | 4 | 1 | 7 | 10 | 9 |
| (CS) Layer 2 | 6 | 0 | 9 | 10 | 7 | 1 | 4 | 3 |
| (CS) Layer 3 | 3 | 9 | 6 | 7 | 10 | 4 | 1 | 0 |
| (CS) Layer 4 | 9 | 3 | 0 | 1 | 4 | 10 | 7 | 6 |

Some embodiments include a design with the following rank-dependent characteristics:

a) OCC code: for a given 3-bit field value, the OCC code does not change from Layer 1 to layer 2, and the OCC code used for layer 3 and layer 4 is different from the OCC code used for layer 1&2. The reason for this design is to allow flexible rank 1 and 2 MU-MIMO scheduling, where DMRS orthogonality is maintained when each UE (SS 111-SS 116) can be scheduled with up to rank 2 and the two UEs (SS 115 and SS 116) are allocated non-identical but overlapping PUSCH resources. For example, SS 115 and SS 116 are both assigned rank-2 transmission, when SS 115 is assigned the 3-bit field of "1" and SS 116 is assigned a three bit-field of "7". Therefore:

UE1: Layer 1: (0,W0), Layer 2: (6,W0)
UE2: Layer 1: (9, W1), Layer 2: (3, W1)

In addition, the OCC code separation can ensure good channel estimation performance for both SS 115 and SS 116.

b) Two alternatives for CS code:

Alt 1: a different set of CS codes is used for layers 3&4, compared to layers 1&2. Therefore, a total of 4 CS is used in 4 layers.

Alt 2: the same set of CS codes is used for layers 3&4, compared to layers 1&2, therefore, a total of 2CS issued in 4 layers.

An example design of this embodiment assuming Alt 1 for CS code is shown in Table 7. An example for Alt 2 can be easily obtained by replacing the CS values in layer 3&4 with the CS values in layers 1&2, as shown in Table 8. Table 7 illustrates mapping of 3-bit to CS and OCC resources: rank 1-4. Note the OCC stays the same in layer 1&2, but switches for layers 3&4. Here Alt 1 of CS code rule is assumed where CS in layers 3&4 are different from layers 1&2.

TABLE 7

| 3-bit field (Resource index) | 0 | 1 | 2 | 3 | 4 | 5 | 6 | 7 |
|---|---|---|---|---|---|---|---|---|
| (CS, OCC) Layer 1 | 0, W0 | 6, W1 | 3, W0 | 4, W1 | 1, W0 | 7, W1 | 10, W0 | 9, W1 |
| (CS, OCC) Layer 2 | 6, W0 | 0, W1 | 9, W0 | 10, W1 | 7, W0 | 1, W1 | 4, W0 | 3, W1 |
| (CS, OCC) Layer 3 | 3, W1 | 9, W0 | 6, W1 | 7, W0 | 10, W1 | 4, W0 | 1, W1 | 0, W0 |
| (CS, OCC) Layer 4 | 9, W1 | 3, W0 | 0, W1 | 1, W0 | 4, W1 | 10, W0 | 7, W1 | 6, W0 |

Table 8 illustrates mapping of 3-bit to CS and OCC resources: rank 1-4. In Table 8, the OCC stays the same in layer 1&2, but switches for layers 3&4. Here Alt 2 of CS code rule is assumed where CS in layers 3&4 are the same as layers 1&2.

TABLE 8

| 3-bit field (Resource index) | 0 | 1 | 2 | 3 | 4 | 5 | 6 | 7 |
|---|---|---|---|---|---|---|---|---|
| (CS, OCC) Layer 1 | 0, W0 | 6, W1 | 3, W0 | 4, W1 | 2, W0 | 8, W1 | 10, W0 | 9, W1 |
| (CS, OCC) Layer 2 | 6, W0 | 0, W1 | 9, W0 | 10, W1 | 8, W0 | 2, W1 | 4, W0 | 3, W1 |
| (CS, OCC) Layer 3 | 0, W1 | 6, W0 | 3, W1 | 4, W0 | 2, W1 | 8, W0 | 10, W1 | 9, W0 |
| (CS, OCC) Layer 4 | 6, W1 | 0, W0 | 9, W1 | 10, W0 | 8, W1 | 2, W0 | 4, W1 | 3, W0 |

In some embodiments, for the SPS scheduled rank-1 transmission or RACH response message, if SS 116 is scheduled in Rel-10 transmission, then $n_{DMRS}^{(2)}$ (the CS value from UL grant discussed herein) shall be set to zero and the OCC shall be set to W0=[11], if there is no PDCCH associated with the uplink grant for the same transport block and if the initial PUSCH for the same transport block is semi-persistently scheduled. Alternatively, if SS 116 is scheduled in Rel-10 transmission, then $n_{DMRS}^{(2)}$ shall be set to zero and the OCC shall be set to W0=[11], if there is no PDCCH associated with the uplink grant for the same transport block and if the initial PUSCH for the same transport block is scheduled by the random access response grant.

In addition, if rank>1 is supported in LTE-A for semi-persistently scheduled transmissions, then for each layer, the (CS, OCC) is set according to the 3-bit field "0", either by Table 5, 6 or 7. For example, if Table 6 is used, then first layer is fixed as (0,W0), $2^{nd}$ layer is fixed as (6, W0), and so forth.

In some embodiments, for the SPS scheduled rank-1 transmission or RACH response message: if SS 116 is scheduled in Rel-10 transmission, $n_{DMRS}^{(2)}$ (the CS value from UL grant discussed in this document) shall be set to zero, and the OCC shall be set to W, where W belongs to the set of {W0,W1}, and is signaling by higher layer RRC signaling, if there is no PDCCH with DCI format 0 or 0A for the same transport block, and if the initial PUSCH for the same transport block is semi-persistently scheduled, or, if the initial PUSCH for the same transport block is scheduled by the random access response grant.

Some embodiments include a design with the following rank-dependent characteristics:

A) one resource mapping table above is used for all ranks of uplink transmission. This allows BS 103 and SS 116 to implement only one table for all ranks of uplink transmission.

B) For the OCC code: the 8 values are divided into 2 subsets:

For a given 3-bit field value in the first subset (e.g., CSI value in {0, 1, 2, 3}, the OCC code does not change from Layer 1 to layer 2, and the OCC code used for layer 3 and layer 4 is different from the OCC code used for layer 1&2.

For a given 3-bit field value in the second subset (e.g., CSI value in {4, 5, 6, 7}), the OCC code does not change from Layers 1 to 3, and the OCC code for layer 4 is different from layers 1 to 3.

The reason for this design is to allow flexible pairing of UEs with different ranks of up to 3, for example pairing of SS 115 with rank-1 and SS 116 with rank-3. For example:

SS 115: layer 1: (0, W0), layer 2: (6,W0), layer 3: (9, W0)
SS 116: layer 1: (3,W1).

In addition, the OCC code separation can ensure good channel estimation performance for both SS 115 and SS 116.

C) Two alternatives for CS code:

1) different set of CS codes is used for layers 3&4, compared to layers 1&2. Therefore, a total of 4 CS is used in 4 layers;

2) For ranks 1, 2 the CS separation among layers is 6, for ranks 3, 4 the CS separation among layers is 3.

Table 9 illustrates mapping of 3-bit to CS and OCC resources: rank 1-4. (the first 4 entries OCC does not change for layers 1&2, the last 4 entries OCC does not change for layers 1, 2, 3).

TABLE 9

| 3-bit field (Resource index) | 0 | 1 | 2 | 3 | 4 | 5 | 6 | 7 |
|---|---|---|---|---|---|---|---|---|
| (CS, OCC) Layer 1 | 0, W0 | 6, W1 | 3, W0 | 4, W1 | 2, W0 | 8, W1 | 10, W0 | 9, W1 |
| (CS, OCC) Layer 2 | 6, W0 | 0, W1 | 9, W0 | 10, W1 | 8, W0 | 2, W1 | 4, W0 | 3, W1 |
| (CS, OCC) Layer 3 | 3, W1 | 9, W0 | 6, W1 | 7, W0 | 11, W0 | 5, W1 | 1, W0 | 0, W1 |
| (CS, OCC) Layer 4 | 9, W1 | 3, W0 | 0, W1 | 1, W0 | 5, W1 | 11, W0 | 7, W1 | 6, W0 |

Some embodiments include a design with the following rank-dependent characteristics:

A) one resource mapping table above is used for all ranks of uplink transmission. This allows BS 103 and SS 116 to implement only one table for all ranks of uplink transmission.

For the OCC code: the 8 values are divided into 3 subsets:

1) For a given 3-bit field value in the first subset (e.g., CSI value in {0, 1, 2, 3}, the OCC code does not change from Layer 1 to layer 2, and the OCC code used for layer 3 and layer 4 is different from the OCC code used for layer 1&2.

2) For a given 3-bit field value in the second subset (e.g., CSI value in {4,5}), the OCC code does not change from Layers 1 to 3, and the OCC code for layer 4 is different from layers 1 to 3.

3) For a given 3-bit field value in the second subset (e.g., CSI value in {6,7}), the OCC code does not change from Layers 1 to 4, or all layers.

This design enables a flexible pairing of UEs with different ranks of up to 3, for example pairing of SS 115 with rank-1 and SS 116 with rank-3. For example: 1) SS 115: layer 1: (0, W0), layer 2: (6,W0), layer 3: (9, W0); and 2) SS 116: layer 1:

(3,W1). In addition, the OCC code separation can ensure good channel estimation performance for both UEs.

B) Two alternatives for CS code:

1) A different set of CS codes is used for layers 3&4, compared to layers 1&2. Therefore, a total of 4 CS is used in 4 layers.

2) For ranks 1, 2 the CS separation among layers is 6, for ranks 3, 4 the CS separation among layers is 3.

An example of such a design is shown in Table 10 below. Table 10 illustrates mapping of 3-bit to CS and OCC resources: rank 1-4 (the first 4 entries OCC does not change for layers 1&2, the next 2 entries OCC does not change for layers 1, 2, 3, the last 2 entries OCC does not change for all layers).

TABLE 10

| 3-bit field (Resource index) | 0 | 1 | 2 | 3 | 4 | 5 | 6 | 7 |
|---|---|---|---|---|---|---|---|---|
| (CS, OCC) Layer 1 | 0, W0 | 6, W1 | 3, W0 | 4, W1 | 1, W0 | 8, W1 | 10, W0 | 9, W1 |
| (CS, OCC) Layer 2 | 6, W0 | 0, W1 | 9, W0 | 10, W1 | 7, W0 | 2, W1 | 4, W0 | 3, W1 |
| (CS, OCC) Layer 3 | 3, W1 | 9, W0 | 6, W1 | 7, W0 | 10, W0 | 5, W1 | 1, W0 | 0, W1 |
| (CS, OCC) Layer 4 | 9, W1 | 3, W0 | 0, W1 | 1, W0 | 4, W0 | 11, W1 | 7, W0 | 6, W1 |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a subscriber station, comprising:
receiving a control message from a base station for scheduling an uplink data transmission, the control message comprising a cyclic shift indicator (CSI) field indicating a cyclic shift (CS) and an orthogonal cover code (OCC); and
transmitting data and reference signals in response to the control message, the reference signal being acquired based on the indicated cyclic shift and the OCC, wherein
in response to the CSI field having a first value among a first subset, an OCC for a first transmission layer is same as an OCC for a second transmission layer, and is different from an OCC for third and fourth transmission layers, and
in response to the CSI field having a second value among a second subset, OCCs for all transmission layers are the same, all elements of the second subset being different from all elements of the first subset.

2. The method as set forth in claim 1, wherein a size of the first subset varies from 0 to 8.

3. The method as set forth in claim 1, further comprising:
using the CSI value to select the cyclic shift and the OCC index based on a plurality of resource mapping table, wherein each of the plurality of resource mapping tables is associated with a respective transmission rank R.

4. The method as set forth in claim 1, wherein a CSI value spacing is at least 3 within a Transmission Rank R=4.

5. The method as set forth in claim 1, wherein CSI fields for the first transmission layer have values of 0, 6, 3, 4, 2, 8, 10, and 9, in an ascending order of corresponding CSI indices from 0 to 7.

6. The method as set forth in claim 1, wherein CSI fields for the second transmission layer have values of 6, 0, 9, 10, 8, 2, 4, and 3, in an ascending order of corresponding CSI indices from 0 to 7.

7. For use in a wireless communications network, a base station configured to communicate with a plurality of subscriber stations, the base station comprising:
a transmit path circuitry configured to transmit a control message for scheduling an uplink data transmission, the control message comprising a cyclic shift indicator (CSI) field indicating a cyclic shift (CS) and an orthogonal cover code (OCC); and
a receive path circuitry configured to receive uplink data and reference signals from the at least one of the plurality of subscriber stations, wherein the uplink data and reference signals are transmitted using a subset of antenna ports according to a transmission rank R,
wherein in response to the CSI field having a first value among a first subset, an OCC for a first transmission layer is same as an OCC for a second transmission layer, and is different from an OCC for third and fourth transmission layers, and
in response to the CSI field having a second value among a second subset, OCCs for all transmission layers are the same, all elements of the second subset being different from all elements of the first subset.

8. The base station as set forth in claim 7, wherein a size of the first subset varies from 0 to 8.

9. The base station as set forth in claim 7, wherein the base station is configured to use the CSI value to select the cyclic shift and the OCC index based on a plurality of resource mapping table, wherein each of the plurality of resource mapping tables is associated with a respective transmission rank R.

10. The base station as set forth in claim 7, wherein a CSI value spacing is at least 3 within a Transmission Rank R=4.

11. The base station as set forth in claim 7, wherein CSI fields for the first transmission layer have values of 0, 6, 3, 4, 2, 8, 10, and 9, in an ascending order of corresponding CSI indices from 0 to 7.

12. The base station as set forth in claim 7, wherein CSI fields for the second transmission layer have values of 6, 0, 9, 10, 8, 2, 4, and 3, in an ascending order of corresponding CSI indices from 0 to 7.

13. For use in a wireless communications network, a subscriber station configured to communicate with at least one base station, the subscriber station comprising:
a receive path circuitry configured to receive a control message for scheduling an uplink data transmission, the control message comprising a cyclic shift indicator (CSI) field indicating a cyclic shift (CS) and an orthogonal cover code (OCC); and
a transmit path circuitry configured to transmit data and reference signals in response to the control message, the reference signal being acquired based on the indicated cyclic shift and the OCC,
wherein in response to the CSI field having a first value among a first subset, an OCC for a first transmission layer is same as an OCC for a second transmission layer, and is different from an OCC for third and fourth transmission layers, and
in response to the CSI field having a second value among a second subset, OCCs for all transmission layers are the same, all elements of the second subset being different from all elements of the first subset.

14. The subscriber station as set forth in claim 13, further comprising a controller configured to:

identify, using the cyclic shift indicator (CSI) value included in the control message, the cyclic shift and an OCC index corresponding to each of reference signals; and use the cyclic shift, the OCC index and the transmission rank to identify the resource index based on the resource mapping table.

15. The subscriber station as set forth in claim 13, wherein the resource mapping table is configured to map the cyclic shift and the OCC index for all transmission ranks R.

16. The subscriber station as set forth in claim 13, wherein a size of the first subset varies from 0 to 8.

17. The subscriber station as set forth in claim 13, wherein a CSI value spacing is at least 3 within a Transmission Rank=4.

18. The subscriber station as set forth in claim 13, wherein CSI fields for the first transmission layer have values of 0, 6, 3, 4, 2, 8, 10, and 9, in an ascending order of corresponding CSI indices from 0 to 7.

19. The subscriber station as set forth in claim 13, wherein CSI fields for the second transmission layer have values of 6, 0, 9, 10, 8, 2, 4, and 3, in an ascending order of corresponding CSI indices from 0 to 7.

20. The subscriber station as set forth in claim 14, wherein the controller is further configured to cause the transmitter to transmit the uplink data using the subset of antenna ports.

* * * * *